United States Patent [19]
Moos

[11] Patent Number: 5,881,152
[45] Date of Patent: Mar. 9, 1999

[54] METHOD AND DEVICE FOR PROTECTING STORED DATA

[75] Inventor: Rainer Moos, Siegen, Germany

[73] Assignee: Deutsche Telekom AG, Bonn, Germany

[21] Appl. No.: 751,626

[22] Filed: Nov. 18, 1996

[30] Foreign Application Priority Data

Nov. 17, 1995 [DE] Germany ........................ 195 42 910.9

[51] Int. Cl.⁶ ....................................................... H04L 9/00
[52] U.S. Cl. .................................................. 380/4; 380/23
[58] Field of Search .............................. 380/4, 23, 25, 380/49, 28, 29, 30

[56] References Cited

U.S. PATENT DOCUMENTS 5,651,064  7/1997  Newell ......................................... 380/4

FOREIGN PATENT DOCUMENTS 0 593 305  4/1994  European Pat. Off. .
4228 692   1/1993  Germany .
4314614    11/1994 Germany .
WO 90/06579 6/1990  WIPO .

*Primary Examiner*—David Cain
*Attorney, Agent, or Firm*—Kenyon & Kenyon

[57] ABSTRACT

Generic information storage devices (magnetic, optical, biological/organic devices) are well-suited for storing, processing, archiving or transporting large amounts of information; they can, however, only be secured against unauthorized access using cryptographic methods. Undetected physical copying and manipulation of the information remains, however, possible. Disclosed is a process and device for combining non-intelligent generic information storage devices with intelligent storage devices and linking their information. The process compresses the stored data from a generic storage device and counts a signature count of the stored data. An ID is then provided to the stored data from a permanently assigned intelligent programmable memory chip. At least part of the compressed data is encrypted using an asymmetric key and transferred to a memory area of the permanently assigned intelligent programmable memory chip.

10 Claims, 3 Drawing Sheets

METHOD AND DEVICE FOR PROTECTING STORED DATA

FIELD OF THE INVENTION

The present invention relates to a method and device for protecting stored data, and more particularly to a method and device for preventing or identifying tampering of stored data.

RELATED TECHNOLOGY

Conventional data storage devices (mass data storage devices of any king such as magnetic, optical, biological-organic devices) are suitable for storing information for subsequent processing, archiving, or transmission. Access to such information can be protected, for example, by cryptographic methods which encode the data. However, the encoded information can still be physically copied in a simple manner.

In the case of such information stored on data storage media for archiving or transmission, the possibility exists in general that the information can be manipulated by unauthorized third parties before it is further processes. The origin of the data storage medium, and even of cryptographically protected data, can only be ascertained with certainty by reading out the information. There therefore is no guarantee that the medium or its data is not altered, or that its content are not copied.

It is also noted that in many applications, singularity, i.e., the one time existence of a piece of information, is important. For example, an electronic public transportation ticket can only be used once.

SUMMARY OF THE INVENTION

An object of the invention is to protect data on generic non-intelligent storage devices from unauthorized manipulation and to make its origin and singularity comprehensible in order to safeguard the origin, integrity, and singularity of the data, via cryptographic scaling of the data storage medium and the data.

The present invention therefore provides a method for protecting stored data in a generic data storage media, wherein:

the data stored in the generic data storage medium are compressed and provided with an ID and a signature count from a permanently assigned intelligent programmable memory chip, at least a part of the compressed data is branched to security software in the memory area of the permanently assigned intelligent programmable memory chip, the data in the memory area of the permanently assigned intelligent programmable memory chip are encrypted and personalized, and the data are protected from unauthorized access and manipulation in the data storage medium via appropriate intelligent system components and cryptographic mechanisms from the memory area of the assigned intelligent programmable memory chip.

An advantageous refinement of this process includes that the appropriate intelligent system components and cryptographic mechanisms from the memory area of the assigned intelligent programmable memory chip are verifiable through personalization of the information to be protected.

The present invention also provides a device for protecting stored data in data storage media of any kind comprising a programmable memory chip installed on a data storage medium, wherein the programmable memory chip has a memory area and a signature counter.

BRIEF DESCRIPTION OF THE DRAWINGS

The invention is explained in detail below using the following figures.

DETAILED DESCRIPTION

Generic data storage devices are data storage devices of any type (magnetic, optical, or biological-organic devices) and storage capacities capable of storing data without actively protecting such data.

Intelligent data storage devices are devices with a generally reduced storage capacity that are capable of actively protecting stored data by processing it using an active process, owing to their design.

Permanent assignment is defined as the formation of a permanent lock-and-key type pair or an inseparable connection between both storage devices.

Figure 1:
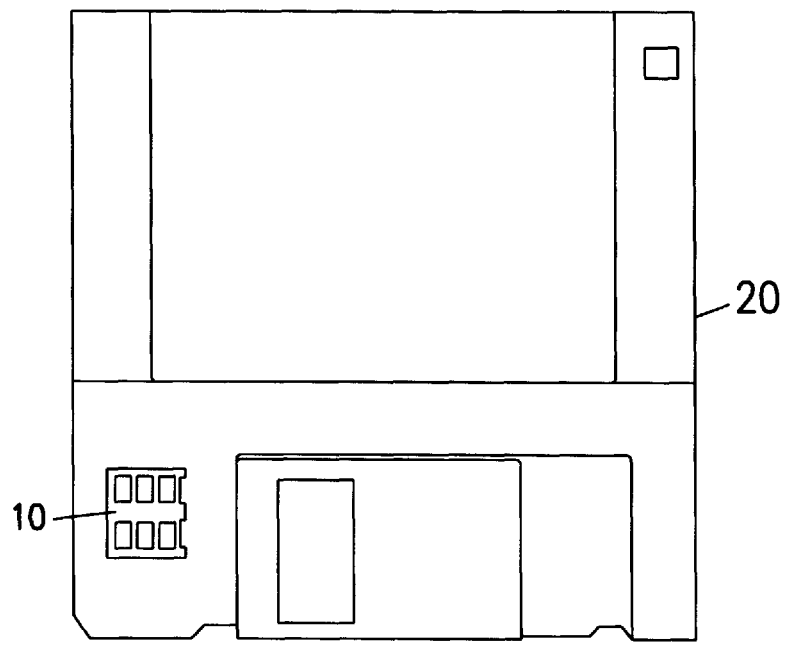
FIG. 1 shows a diskette with an integrated intelligent processor chip.
Figure 2:
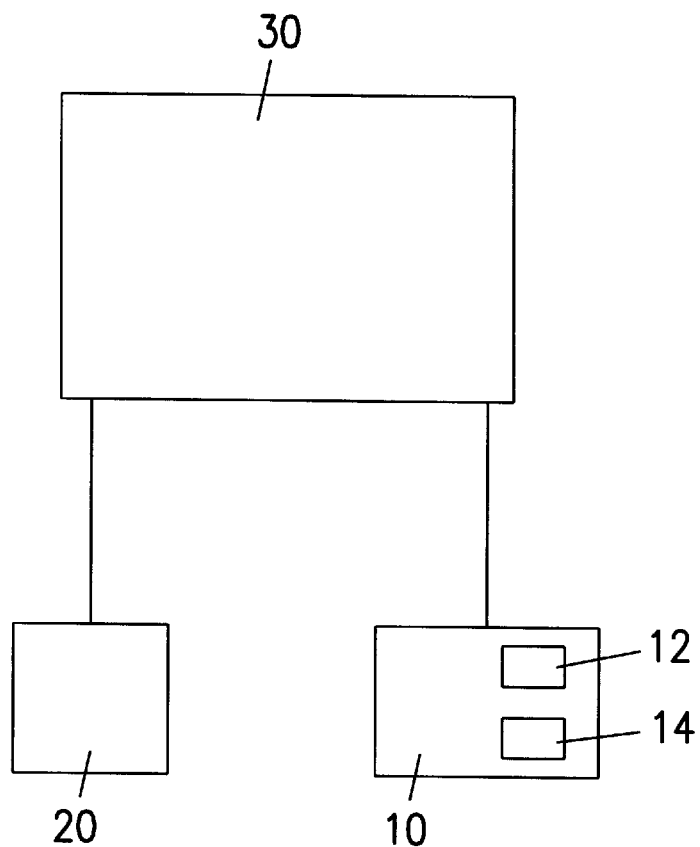
FIG. 2 shows a schematic of a system using the diskette with an integrated processor chip.

Referring to FIGS. 1 and 2, the intelligent data storage medium (chip) 10 contains an asymmetric key comprising a public and a secret part, a symmetric key for authentication, an ID and a signature counter 14. Due to its design, it is capable of actively safeguarding these components. Data can be written to certain memory areas of the chip. Referring to FIG. 2, memory area 12 stores the ID and asymmetric key information.

The asymmetric key pair is permanently linked to the ID. The symmetric key serves for distinguishing different systems from one another. This information must be generated, managed, and personalized in a secure memory area. When such a crypto-secret is generated and personalized, a data storage device is automatically assigned to validity range. All systems in the possession of the symmetric authentication key are capable of validly writing into such data storage devices.

Systems for writing into or reading from such protected data storage devices have:

conventional read/write devices;

appropriate points of chip contact surfaces according to ISO standards; and a software module for operating the chip.

Referring to FIG. 2, a computer 30 contains security software for operating the chip 10 on a generic storage device or medium 20 (also identified in FIG. 1).

Such a data storage medium can be read or written to in the conventional manner first. If it is necessary to safeguard the origin, integrity, and singularity of the data, then the operation must branch over to the security software after the data are written.

Figure 3:
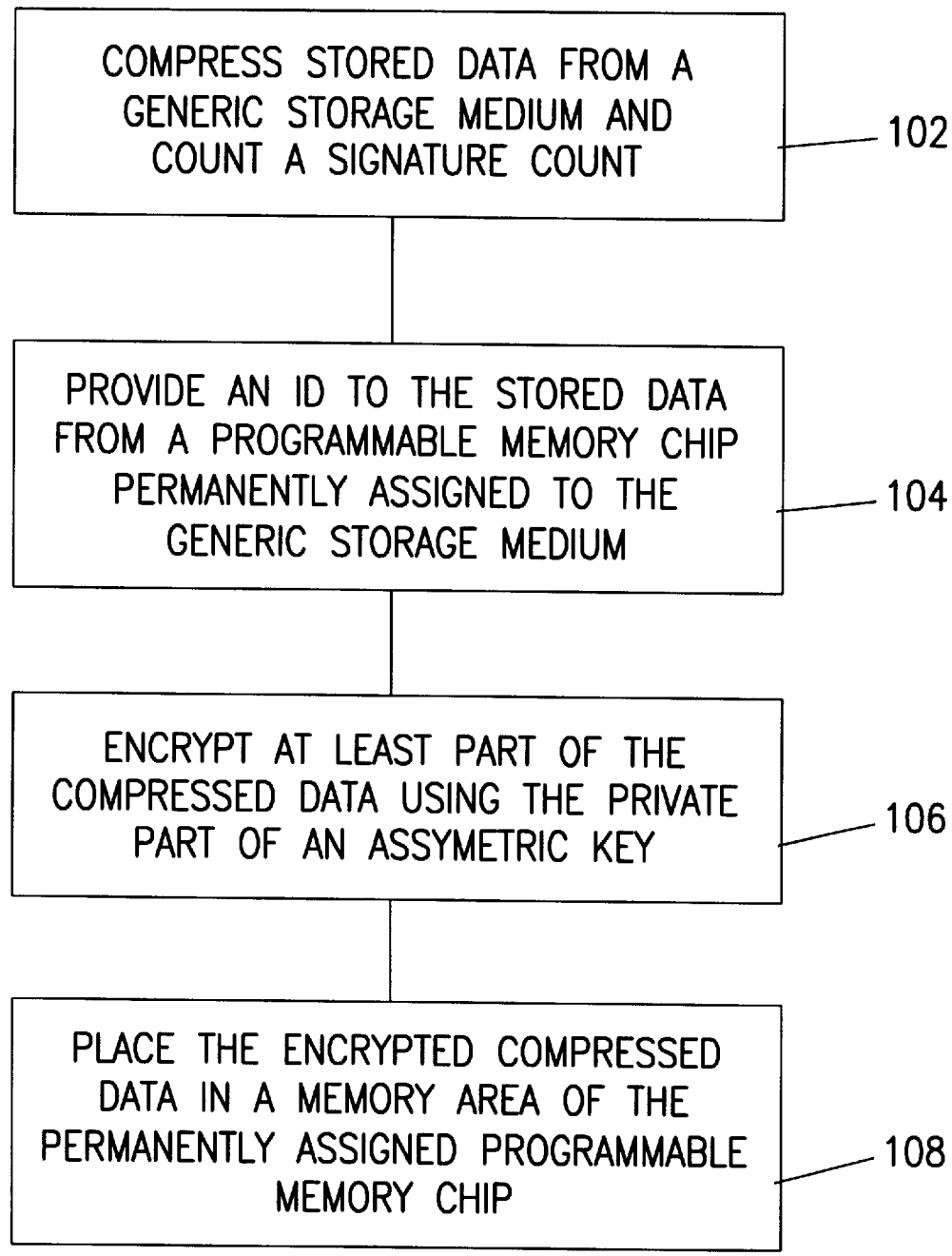
FIG. 3 shows a flowchart of the method of the present invention.

A standard algorithm generates a unique compressed form of the data, as shown in step 102 of FIG. 3. This compressed data is provided with an ID (step 104) and a signature count from the chip. The data is encrypted with the secret part of the asymmetric key (step 106), and is stored in the memory area of the chip (step 108). The signature counter status is entered into the data storage medium to be protected.

The functionality of the secret asymmetric key is secured with the help of a so-called "challenge and response" with the aid of the symmetric key. This means that the user group-dependent symmetric key must also be contained in the security software.

An authorized target system can uniquely identify a data storage device thus secured. For this purpose, a challenge and response exchange is carried out between the software and the chip and thus the validity of the data storage device is established. Subsequently the data is read in the conventional manner and compressed with the same algorithm used for writing. The cryptogram obtained after writing to the data storage device is read from the memory of the chip and decoded using the public part of the asymmetric key.

In order to establish the validity of the data in the target system, the following conditions must be met:

self-generated data=decoded compressed data chip ID=decoded ID signature counter status on data storage device=decoded signature counter status.

If any of these conditions is not met, the data storage device is not accepted by the target system.

The programmable processor manages such a linkage of information stored on the diskette and the physical data storage medium with the ID of an authorized user or process with access to this information. The ID of the user or process is checked by the intelligent processor chip via a separate interface. If the ID of the authorized user or process cannot be proven to the processor chip, access to the stored information is denied.

Copying of the stored information can be prevented or verified using information generated and managed by the processor and stored on the data storage device.

The contents of a data storage device are linked to the personalized key from an active storage device using a cryptographic process and are, thus, sealed. Any changes made by "third parties" can thus be detected at any time, since only "known" systems are capable of generating valid data storage media, securing data integrity, and establishing the singularity of the data through a reference. System components or users are defined as "known" by being recognized by all system components or users involved in the system.

Cryptographically secured data become an original (document) only through the physical presence of the attached personalized intelligent storage device. The personalizing entity ensures in a verifiable way the issuance and uniqueness of the reference key of the intelligent storage device.

The security is achieved automatically or manually by the intelligent system component: the security function being capable of being turned on and off.

The process can also be integrated into communication systems and used in networked system components for protecting information.

The connection/installation of an intelligent system component is illustrated, using a diskette as an example, in FIG. 1. It can, however, be performed with any information storage device (magnetic, optical, biological/organic device) through a mechanical or logical connection and secured from unauthorized manipulation, preventing copying, modification, or other changes or variations and ensuring the singularity of the information.

Appropriate cryptographic methods and asymmetric keys are described in U.S. Pat. Nos. 4,351,982 and 5,166,978, which are hereby incorporated by reference herein.

What is claimed is:

1. A method for protecting stored data in a generic data storage media comprising the steps of:

compressing the stored data and counted a signature count of the stored data;

providing an ID to the stored data from a permanently assigned programmable memory chip;

encrypting at least part of the compressed data using an asymmetric key; and placing the encrypted data in a memory area of the permanently assigned programmable memory chip.

2. The method as recited in claim 1 wherein all of the compressed data is encrypted.

3. The method as recited in claim 1 wherein the asymmetric key is specified to the programmable memory chip.

4. The method as recited in claim 1 wherein the ID is provided both to the compressed stored data and to the stored data in the generic data storage device.

5. The method as recited in claim 4 wherein the ID provided to the compressed stored data is encrypted.

6. The method as recited in claim 1 further comprising the step of providing the signature count to the stored data in the generic storage device.

7. The method as recited in claim 1 further comprising the step of providing the signature count to the compressed stored data.

8. The method as recited in claim 7 wherein the signature count is encrypted.

9. A protectable data storage device comprising:

a data storage medium; and a programmable memory chip installed on said data storage medium, wherein the programmable memory chip comprises a memory area and a signature counter for counting an amount of data.

10. The protectable data storage device as recited in claim 9 wherein the programmable memory chip comprises an asymmetric key having a public and a secret part, a symmetric key for authentication, and an ID.

* * * * *